United States Patent
Harris et al.

(10) Patent No.: US 11,370,546 B2
(45) Date of Patent: Jun. 28, 2022

(54) CREW REST COMPARTMENT STAIR CLOSURE MECHANISM

(71) Applicant: B/E Aerospace, Inc., Winston-Salem, NC (US)

(72) Inventors: Adam L. Harris, Leighton Buzzard (GB); Daniel H. Wall, Baldock (GB); Rafal H. Chylinski, Milton Keyes (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 251 days.

(21) Appl. No.: 16/723,320

(22) Filed: Dec. 20, 2019

(65) Prior Publication Data
US 2021/0188440 A1 Jun. 24, 2021

(51) Int. Cl.
*B64D 11/00* (2006.01)

(52) U.S. Cl.
CPC ...... *B64D 11/00* (2013.01); *B64D 2011/0076* (2013.01)

(58) Field of Classification Search
CPC ............ B64D 11/00; B64D 2011/0076; B64D 2011/0046; B61D 19/02; B61D 19/023; B61D 19/026; B61D 23/00; B61D 23/02; E06B 7/28; E05D 11/1014
USPC .......................................................... 49/70
See application file for complete search history.

(56) References Cited

U.S. PATENT DOCUMENTS

| | | | | |
|---|---|---|---|---|
| 995,889 A * | 6/1911 | Miller | ............ | B61D 23/02 |
| | | | | 105/434 |
| 1,239,892 A * | 9/1917 | Dunderdale | ......... | B61D 23/02 |
| | | | | 105/430 |
| 1,443,057 A * | 1/1923 | Swanson | ............. | B61D 23/02 |
| | | | | 105/448 |
| 2,190,694 A * | 2/1940 | Brittain | ................. | B61D 23/02 |
| | | | | 105/429 |
| 2,522,674 A * | 9/1950 | Heyerdahl | ............ | B61D 23/02 |
| | | | | 105/430 |
| 2,546,626 A * | 3/1951 | Beezhold | .............. | B61D 23/02 |
| | | | | 105/430 |
| 3,724,396 A * | 4/1973 | Roth | ..................... | B61D 23/02 |
| | | | | 105/378 |

(Continued)

FOREIGN PATENT DOCUMENTS

| | | |
|---|---|---|
| EP | 2546144 B1 | 5/2019 |
| FR | 2916735 A1 | 12/2008 |

(Continued)

OTHER PUBLICATIONS

Extended Search Report for European Application No. 20216173.3 dated May 11, 2021, 9 pages.

*Primary Examiner* — Joshua J Michener
*Assistant Examiner* — Arfan Y. Sinaki
(74) *Attorney, Agent, or Firm* — Suiter Swantz pc llo

(57) ABSTRACT

A stair closure mechanism is disclosed. In embodiments, the stair closure mechanism is attached to and deploys in concert with a door separating an overhead crew rest compartment and access stairway from the main cabin. As the door is closed, a closure panel mechanically pivots with the closing of the door into a horizontal deployed position. When in the deployed position, the closure panel conforms to the floor of the overhead compartment, securely blocking the free space between the stairway and the floor from persons in the overhead compartment who might otherwise step or stumble thereinto.

8 Claims, 10 Drawing Sheets

(56) References Cited

U.S. PATENT DOCUMENTS

| | | | | |
|---|---|---|---|---|
| 5,070,794 A * | 12/1991 | Kunst | | B61D 19/02 |
| | | | | 105/436 |
| 5,395,075 A * | 3/1995 | Sprenger | | B64D 11/00 |
| | | | | 182/77 |
| 6,263,804 B1 * | 7/2001 | Rizk | | B61D 23/02 |
| | | | | 105/329.1 |
| 6,401,629 B1 * | 6/2002 | Brunooghe | | B61D 19/02 |
| | | | | 105/329.1 |
| 6,739,100 B1 * | 5/2004 | Lewandowski | | E04F 11/02 |
| | | | | 52/184 |
| 8,740,145 B2 | 6/2014 | Wesselink et al. | | |
| 2001/0025585 A1 * | 10/2001 | Rizk | | B61D 23/02 |
| | | | | 105/343 |
| 2002/0078855 A1 * | 6/2002 | Neugebauer | | B61D 23/02 |
| | | | | 105/397 |
| 2010/0301163 A1 * | 12/2010 | Guering | | B64D 11/00 |
| | | | | 244/118.6 |
| 2010/0307060 A1 * | 12/2010 | Slimak | | E05B 65/006 |
| | | | | 49/70 |
| 2011/0233333 A1 * | 9/2011 | Papke | | B64D 11/00 |
| | | | | 244/118.6 |
| 2012/0193472 A1 * | 8/2012 | Guering | | B64D 11/00 |
| | | | | 244/118.6 |
| 2013/0015293 A1 * | 1/2013 | Wesselink | | B64D 11/00 |
| | | | | 244/118.5 |
| 2018/0023285 A1 | 1/2018 | Smith | | |
| 2019/0241247 A1 * | 8/2019 | Movsesian | | B64D 45/0026 |
| 2019/0291555 A1 | 9/2019 | Park | | |

FOREIGN PATENT DOCUMENTS

| | | |
|---|---|---|
| GB | 2428446 A | 1/2007 |
| GB | 2537440 A | 10/2016 |
| WO | 0105639 A2 | 1/2001 |
| WO | 2011081854 A2 | 7/2011 |

* cited by examiner

CREW REST COMPARTMENT STAIR CLOSURE MECHANISM

TECHNICAL FIELD

The subject matter disclosed herein is directed generally to aircraft interiors and more particularly to safety devices for aircraft crew rest areas.

BACKGROUND

Widebody and larger commercial aircraft configured for transoceanic or long-haul flights may designate areas for crewmembers to spend required rest periods away from the cockpit or passenger cabin. For example, crew rest areas may be situated in overhead compartments located above the main floor of the passenger cabin, and accessible to crewmembers via stairways leading up from the main cabin. As these areas are intended for crewmembers rather than passengers or the general public, these stairways may be separated from the main cabin by doors operable from the overhead compartment. However, these doors may leave a portion of the stairway exposed to persons in the overhead compartment, presenting a hazard should those persons stumble or fall into the free space between the stairway and the door.

SUMMARY

A stair closure mechanism is disclosed. In embodiments, the stair closure mechanism includes a substantially vertical door capable of separating the main cabin of an aircraft from an overhead crew rest compartment and from a stairway leading from the main cabin to the overhead rest compartment. For example, the door may be opened by crew traveling between the compartment and the main cabin and otherwise closed for privacy and security. The mechanism includes a closure panel mounted to the door and pivotable relative thereto. The closure panel an undeployed state whereby the panel rests in a vertical orientation, substantially parallel to the door. When the door is closed, the closure panel pivots into a deployed state, e.g., substantially flush with the compartment floor and protecting the open stairway from accidental entry by persons in the overhead compartment.

A fixed stair closure panel is also disclosed. In embodiments, the stair closure mechanism includes a substantially vertical door capable of separating the main cabin of an aircraft from an overhead crew rest compartment and from a stairway leading from the main cabin to the overhead rest compartment. For example, the door may be opened by crew traveling between the compartment and the main cabin and otherwise closed for privacy and security. A closure panel extends orthogonally from the door and coplanar with the floor of the overhead compartment, protecting persons in the overhead compartment from accidental entry into the open stairway when the door is closed.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
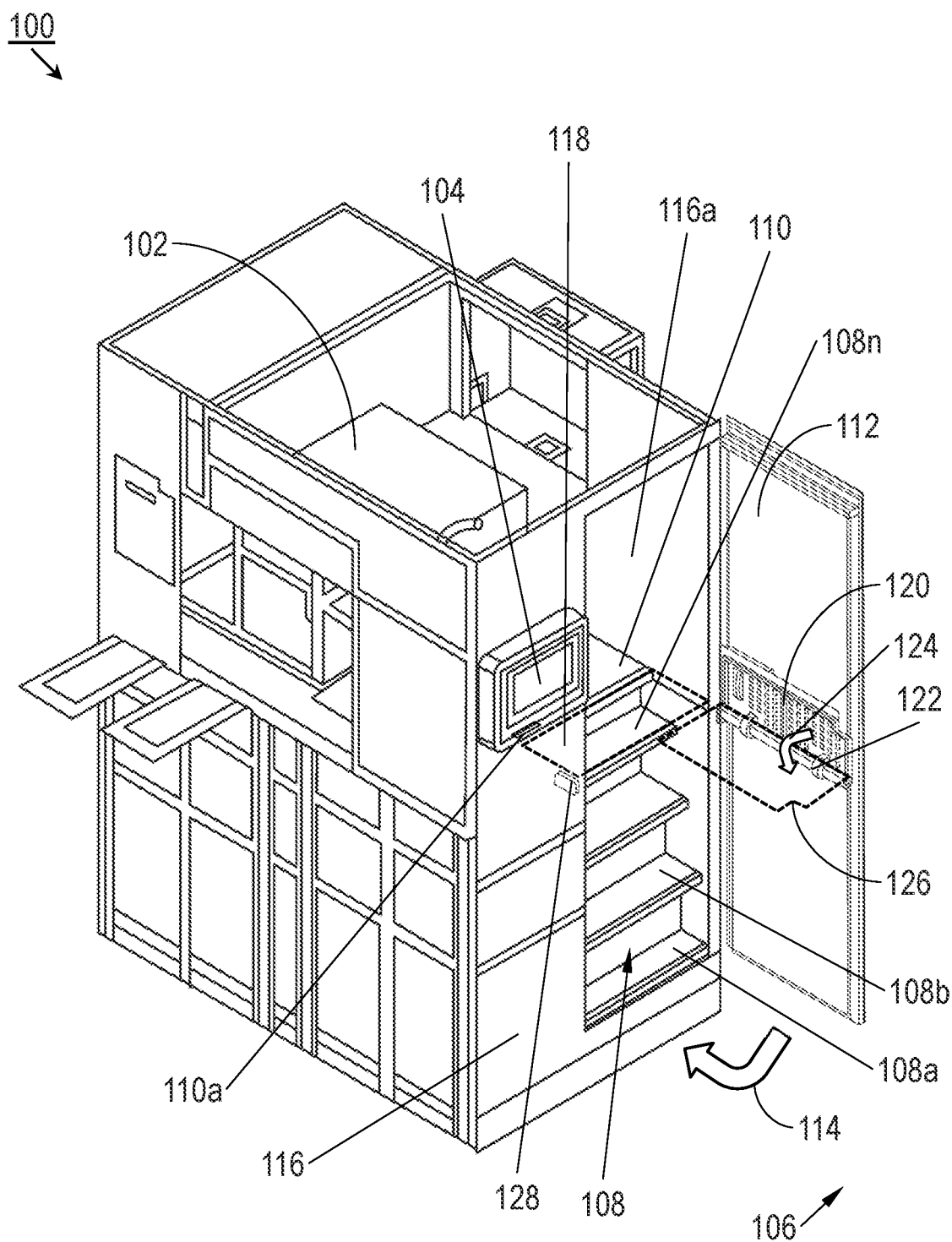
FIG. 1 is an isometric view of an overhead compartment incorporating a stair closure mechanism in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a"

and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, an overhead compartment 100 is disclosed. The overhead compartment 100 may include one or more beds 102 set aside for crewmembers on their rest periods and an indicator 104 to indicate to persons outside the overhead compartment (e.g., on the main floor) whether or not the overhead compartment is currently occupied. In some embodiments, the overhead compartment 100 may include seating, changing areas, entertainment equipment, or galley facilities.

In embodiments, the overhead compartment 100 may be located above the main floor 106 (e.g., main cabin, passenger cabin) of an aircraft and may be accessible therefrom via a stairway 108. For example, a crewmember on the main floor 106 may ascend up a series of steps 108a, 108b, ... 108n to reach the floor 110 of the overhead compartment 100. The stairway 108 may be concealed by, and accessible via, a door 112. For example, a crewmember may ascend the stairway 108 into the overhead compartment 100 and close (114) the door 112 behind them, e.g., for privacy and security, such that the door, shown by FIG. 1 in an open state, may rest in its closed state substantially flush with the outer wall 116 of the overhead compartment 100 (e.g., an inner wall of the main cabin.

In embodiments, when the door 112 is in a closed state, there may remain a free space 118 between the floor 110 of the overhead compartment 100, the inner wall 112a of the door 112, and the inner wall 116a (e.g., bulkhead) of the overhead compartment. For example, due to space considerations the stairway 108 may be compact and steep. Any crewmembers in the overhead compartment 100 may be at risk of injury should they stumble or fall into the free space 118. Accordingly, the door 112 may include a closure panel 120 mounted to the door by one or more hinges 122.

In embodiments, the closure panel 120 may remain in an undeployed position, e.g., substantially parallel to the door 112, while the door is in an open state. However, when the door 112 is closed (114), or begins a transition from the open state to the closed state, the closure panel 120 may likewise pivot (124) to a deployed position 126 (e.g., as the closure panel engages with a rounded block 128 positioned in the stairway 108, just below the level of the floor 110. When in the deployed position 126, the closure panel 120 may rest substantially coplanar with the floor 110 of the overhead compartment 100, blocking the free space 118 and preventing any persons within the overhead compartment from falling thereinto.

Referring now to FIGS. 2A through 2D, the overhead compartment 100 is shown.

Figure 2A:
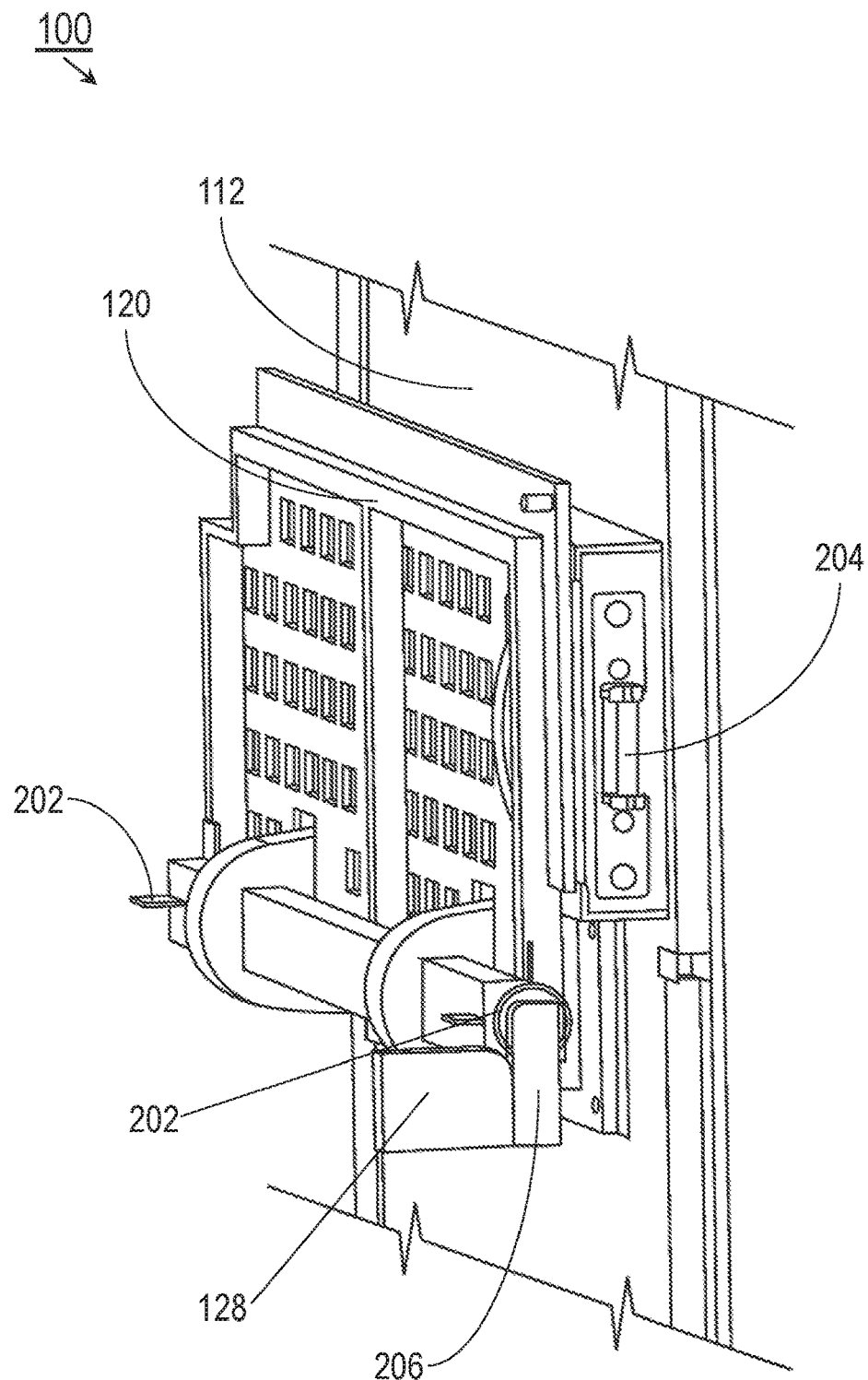
FIG. 2A is an isometric illustration of a closure panel of the stair closure mechanism of FIG. 1 in an undeployed position.

In embodiments, the closure panel 120 may be held in the undeployed position shown by FIG. 2A, substantially parallel to the door 112 separating the stairway (108, FIG. 1) and overhead compartment 100 from the main passenger cabin (106, FIG. 1) by torsion springs 202. For example, the torsion springs 202 may hold the closure panel 120 in the undeployed position (e.g., such that a latch mechanism 204 and handle 204a of the door 112 may be located behind the closure panel) until the door 112 is closed (e.g., by a crewmember having entered the overhead compartment 100 via the stairway 108).

Figure 2B:
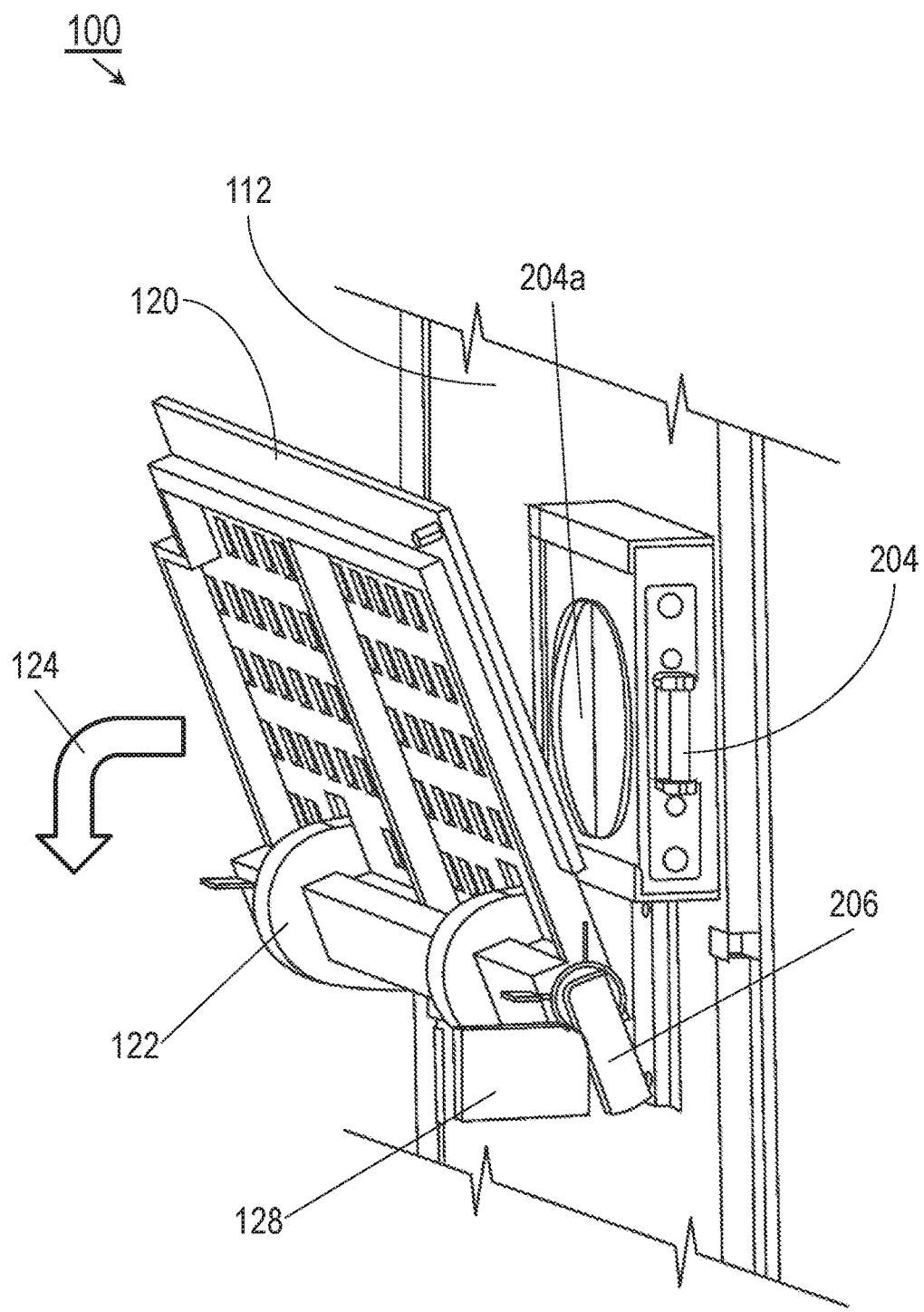
FIGS. 2B and 2C are isometric views of the closure panel of FIG. 2A in respectively a partially deployed position and a fully deployed position.

Referring in particular to FIG. 2B, the closure panel 120 may include a lever arm 206 mounted to and aligned with the closure panel. In embodiments, as the door 112 transitions from the open state shown by FIG. 2A to a partially closed state shown by FIG. 2B, the lever arm 206 may engage with the block 128 mounted to the overhead compartment 100. For example, upon engagement with the block 128, the lever arm 206 may pivot downward (e.g., from the substantially vertical orientation shown by FIG. 2A), and the closure panel 120 fixed thereto may pivot (124; relative to the hinges 122) with the lever arm downwards through the partially deployed position shown by FIG. 2B into the fully deployed position (126, FIG. 1) shown by FIG. 2C. In some embodiments, the block 128 may be partially rounded to assist in the pivoting action of the lever arm 206.

Figure 2C:
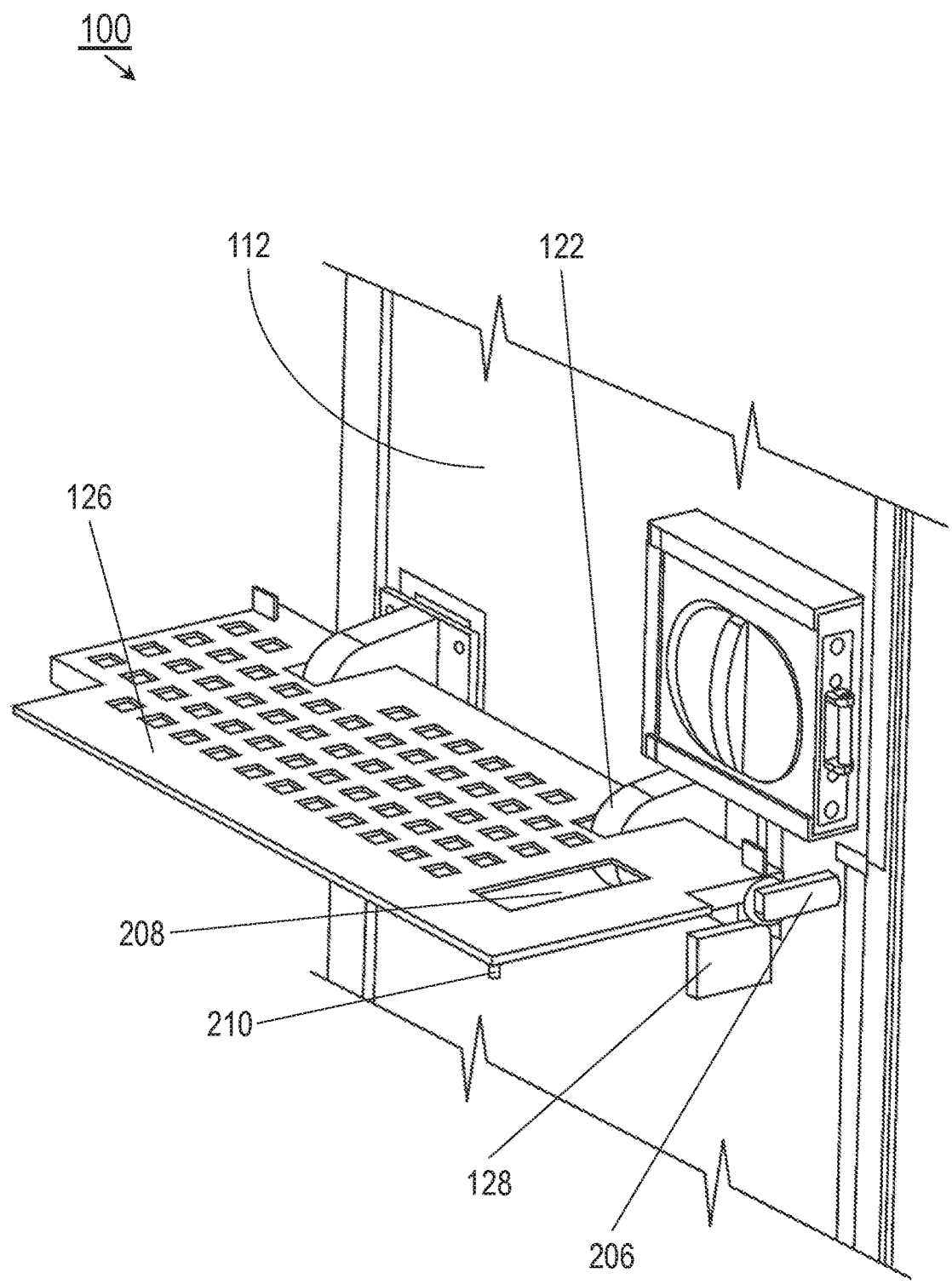

Referring in particular to FIG. 2C, the closure panel 120 may pivot downward (124) along the hinges 122 as the lever arm 206 engages with the block 128, until the closure panel reaches the fully deployed position 126 substantially horizontal and flush with the floor (110, FIG. 1) of the overhead compartment 100; the fully deployed closure panel 126 may safely block the free space (118, FIG. 1) such that any persons inside the overhead compartment cannot step, stumble or otherwise fall thereinto.

In some embodiments, the closure panel 120 may be mechanically unassisted, e.g., secured in the undeployed position via a latch or turn button instead of the torsion springs 202. For example, the mechanically unassisted deployed closure panel 126 may be manually raised back into the undeployed position, e.g., via a handle 208 or similar slot cut into the closure panel and capable of accommodating a standard size hand.

Figure 2D:
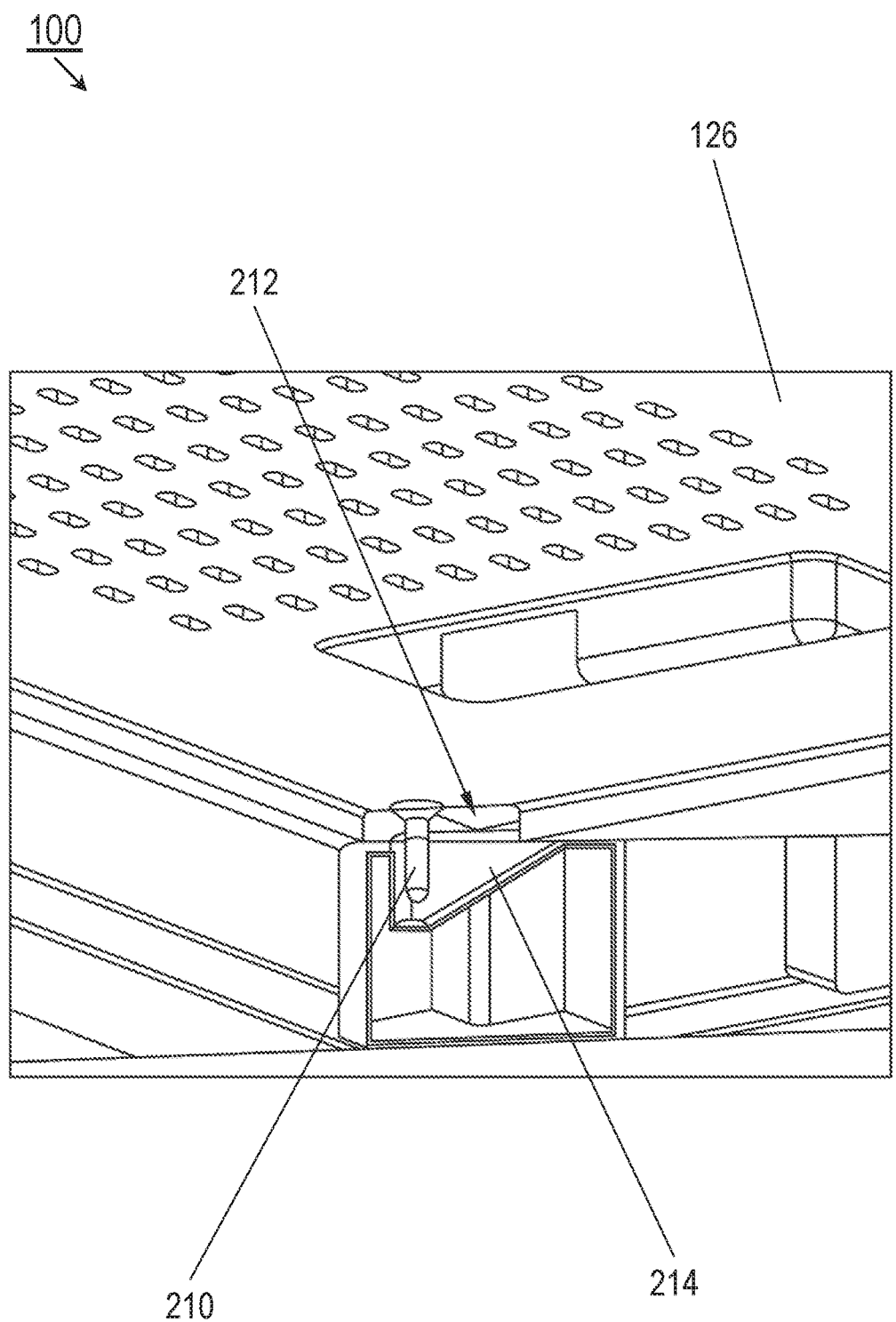
FIG. 2D is a partial cross sectional view of the closure panel of FIG. 2D.

Referring in particular to FIGS. 2C and 2D, the closure panel 120, 126 may include a pin 210 set into one or more underside corners of the closure panel. In embodiments, when the closure panel 120 pivots into the fully deployed position 126 shown by FIG. 2C, the pin 210 may engage with a corresponding slot 212 in the floor of the overhead compartment 100 (e.g., alternatively within a step of the stairway 108a) to secure the closure panel in the fully deployed position. For example, if the fully deployed closure panel 126 bears a load having any significant weight (e.g., if a crewmember is at least partially standing on the deployed closure panel), the engagement of the pin 210 in the slot 212 may prevent the opening of the door 112 (e.g., by a crewmember outside the overhead compartment 100 and stairway 108a) when a crewmember is standing on the deployed closure panel.

Referring in particular to FIG. 2D, in some embodiments the slot 212 may be ramped (214) to aid in disengagement of the pin 210 (e.g., and easy reopening of the deployed closure panel 126 and door 112).

Figure 3A:
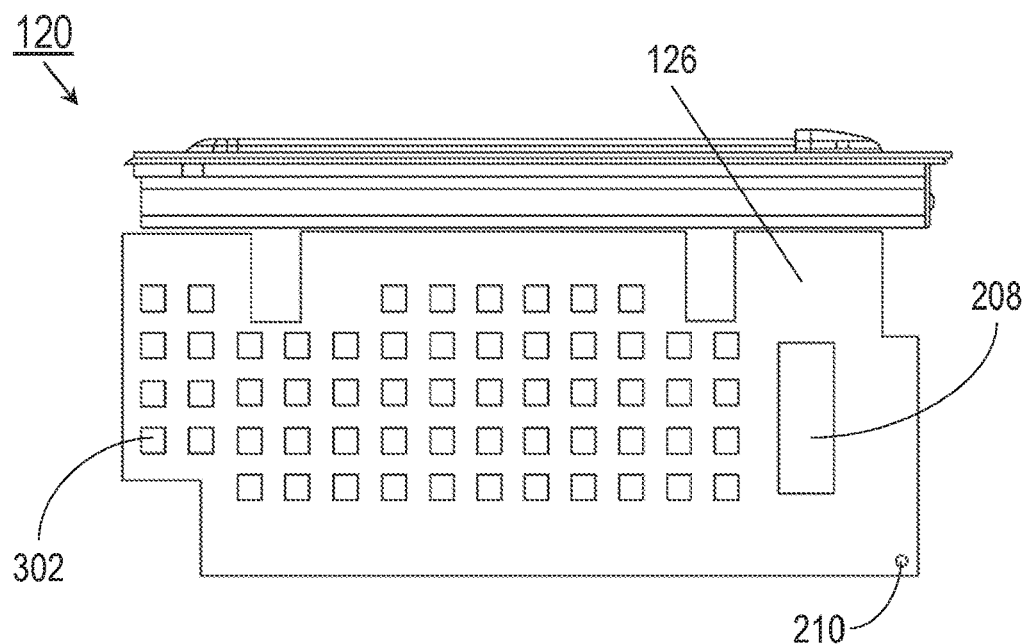
FIGS. 3A and 3B are respectively overhead and isometric dorsal views of the closure panel of FIG. 2A.

Referring to FIG. 3A, the closure panel 120 is shown.

In embodiments, the surface of the closure panel 120 (e.g., shown in its fully deployed position 126) may include perforations 302 set into and extending through the closure panel, e.g., in a two-dimensional array (accounting for the shape of the closure panel). For example, the perforations 302 may strengthen the closure panel 120 and allow the free circulation of air therethrough and into the overhead compartment (100, FIG. 1). For example, once the door 112 is reopened the torsion springs (202, FIG. 2A) may return the fully deployed closure panel 126 to the undeployed position (e.g., shown by FIG. 2A). In some embodiments, the handle 208 may enable manual or emergency operation of the fully deployed closure panel 126, e.g., provided that a load on the closure panel does not prevent disengagement of the pin 210 from the slot (212, FIG. 2D). See, e.g., FIG. 2C above.

Figure 3B:
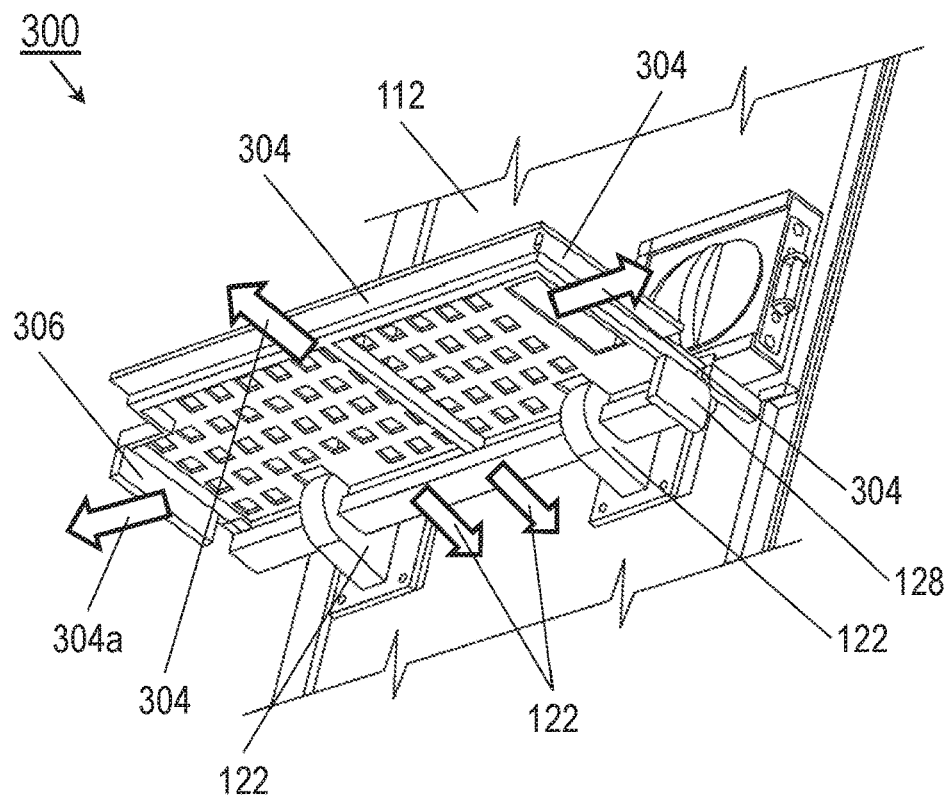

Referring to FIG. 3B, the closure panel 300 may be implemented and may function similarly to the closure panel 120 and fully deployed closure panel 126 of FIGS. 2A through 3A, except that the closure panel 300 may incorporate load transfer elements 304. In embodiments, the load transfer elements 304 may engage with portions of the stairway (108, FIG. 1) or the overhead compartment (100, FIG. 1), e.g., with load bearing elements 306 incorporated into the stairway opposite the block 128) to partially transfer (304a) any load borne by the fully deployed closure panel 300 (e.g., if a crewmember is standing on the fully deployed closure panel) to an adjacent bulkhead (e.g., the inner wall (116a, FIG. 1) of overhead compartment 100, FIG. 1). Similarly, the load transfer elements 304 may transfer the load (304a) to the floor (110, FIG. 1) of the overhead compartment 100 immediately adjacent to the fully deployed closure panel 300. The load transfer elements 304 may, individually or in combination, reduce the load on the hinges 122, which may otherwise transfer (122a) any load on the fully deployed closure panel 300 to the door 112.

Figure 4A:
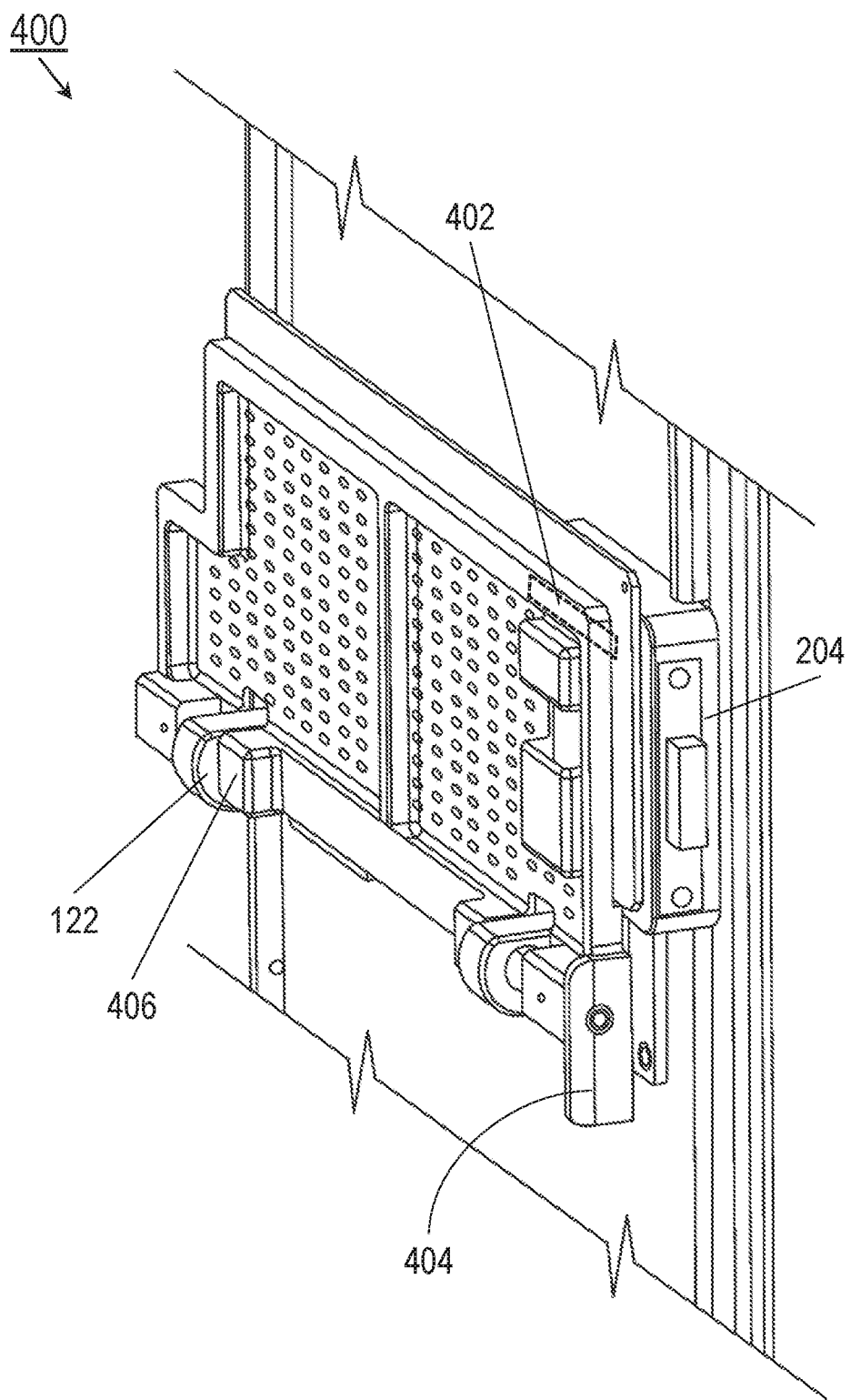
FIG. 4A is an isometric view of a closure panel of the overhead compartment of FIG. 1 in an undeployed position.
Figure 4B:
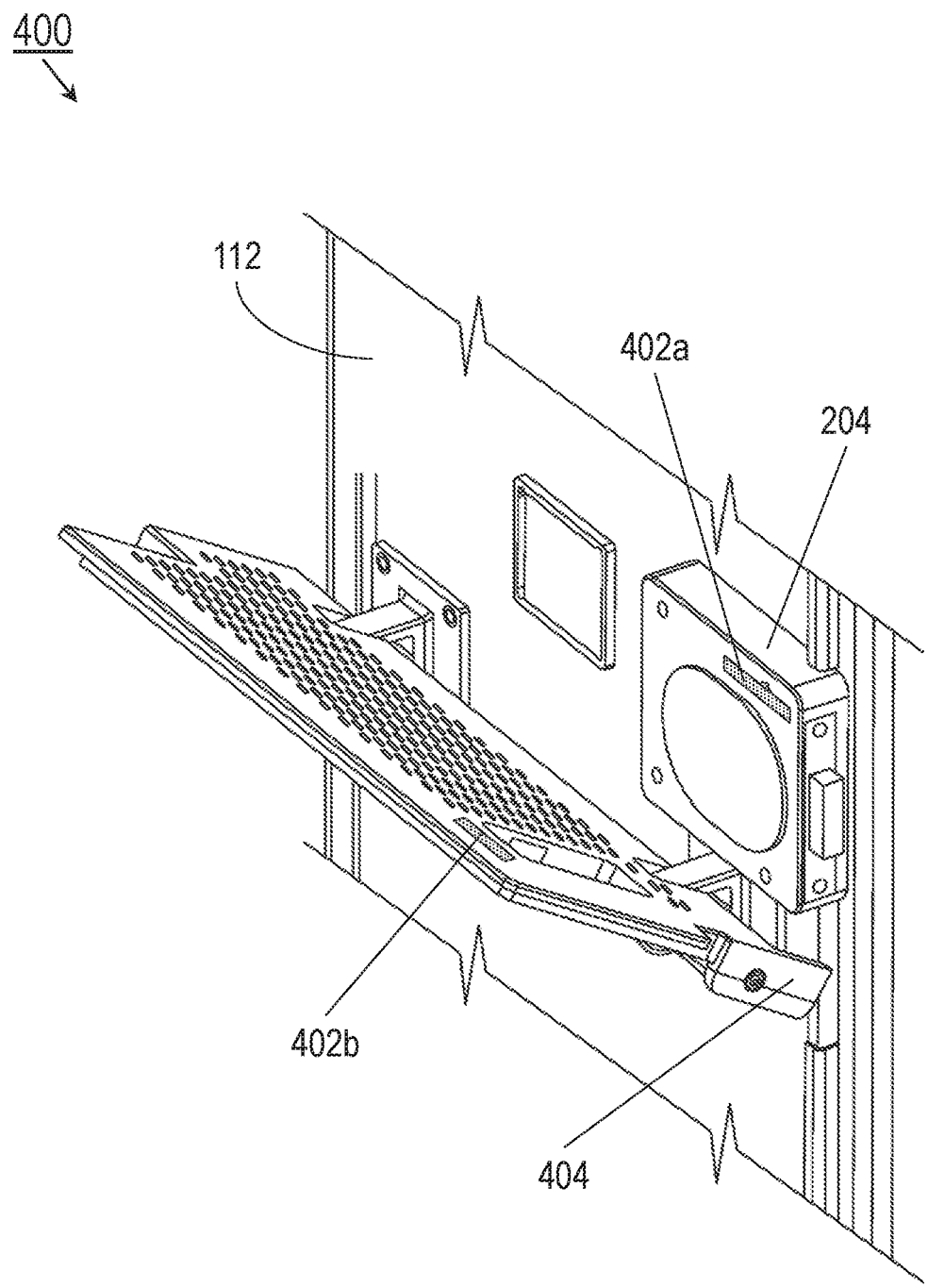
FIGS. 4B and 4C are isometric views of the closure panel of FIG. 4A in respectively a partially deployed position and a fully deployed position.

Referring to FIGS. 4A through 4D, the closure panel 400 may be implemented and may function similarly to the closure panels 120, 300 of FIGS. 1 through 3B, except that the closure panel 400 may be secured in the undeployed position shown by FIG. 4A by magnetic strips 402.

In embodiments, the magnetic strips 402 may include mutually attractive magnetic strips 402a, 402b attached respectively to the outer surfaces of the latch mechanism 204 of the door 112 and to the inner face of the undeployed closure panel 400. For example, the closure panel 400 may include a trigger 404 (or, e.g., an electromagnetic switch, mechanical latch, or manually operated magnetic release (e.g., via the handle 208)) capable of manually or electronically disengaging the magnetic bond between the magnetic strips 402a-b such that the closure panel 400 pivots into the fully deployed position shown, e.g., by FIG. 4C.

Figure 4C:
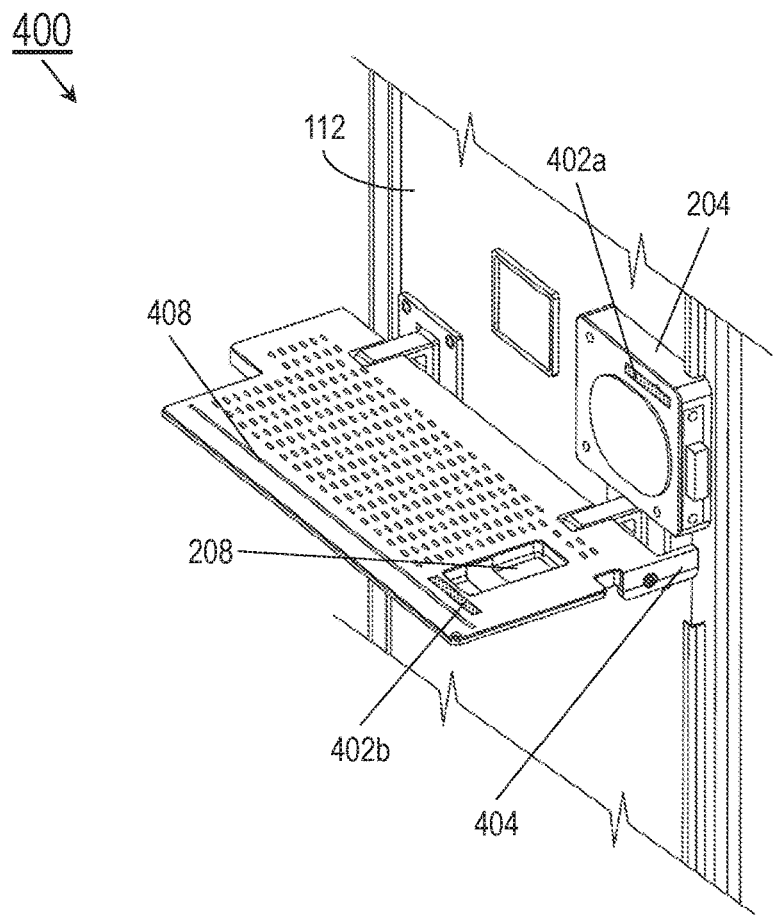
Figure 4D:
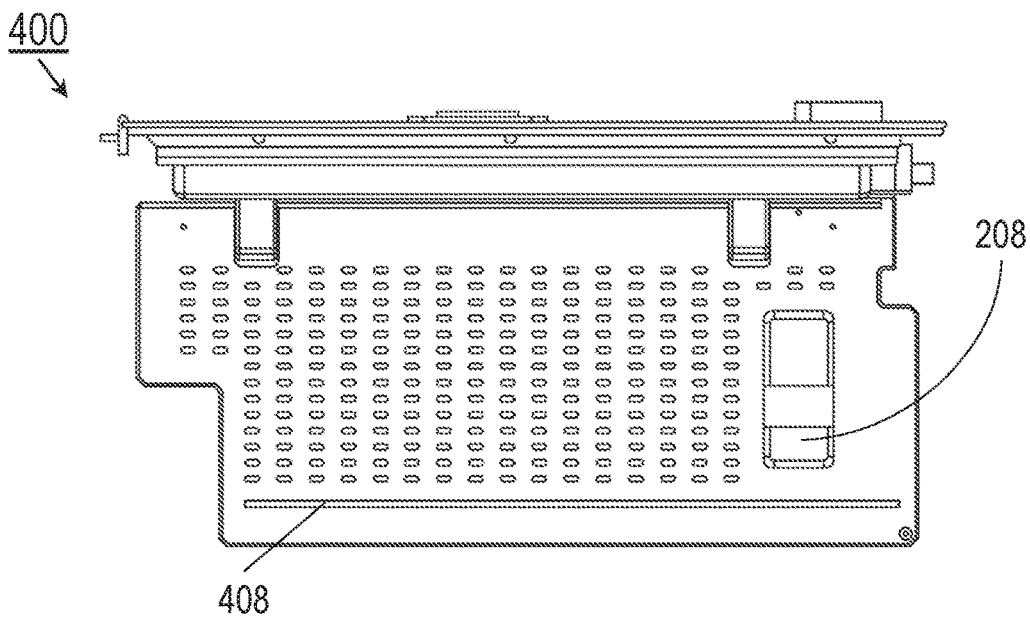
FIG. 4D is an overhead view of the closure panel of FIG. 4C.

In embodiments, the hinges 122 may incorporate dampeners 406. For example, the dampeners 406 may regulate the deployment of the closure panel 400 to a maximum rate, such that the closure panel pivots slowly and softly into the fully deployed position. Referring in particular to FIGS. 4C and 4D, the closure panel 400 may incorporate a secondary magnetic strip 408 along its length. In embodiments, the secondary magnetic strip 408 may secure the fully deployed closure panel 400 to a corresponding magnetic strip (110a, FIG. 1) in the floor (110, FIG. 1) of the overhead compartment (100, FIG. 1), e.g., to prevent rattling inflight. For example, the secondary magnetic strip 408 may be embedded into the closure panel 400 (and mate with a magnet in the latch mechanism 204), or the secondary magnetic strip 408 may be installed atop the closure panel 400 (e.g., incorporated into a bumpstrip) with a mating magnet attached to the door 112. Alternatively, a portion of the closure panel 400 may be fashioned of a ferromagnetic material capable of engaging and disengaging with a mating magnet incorporated into the latch mechanism 204.

Referring in particular to FIG. 4D, the fully deployed closure panel 400 may require manual retraction of the closure panel (e.g., restoration to the undeployed position shown, e.g., by FIG. 4A) via the handle 208.

Figure 5:
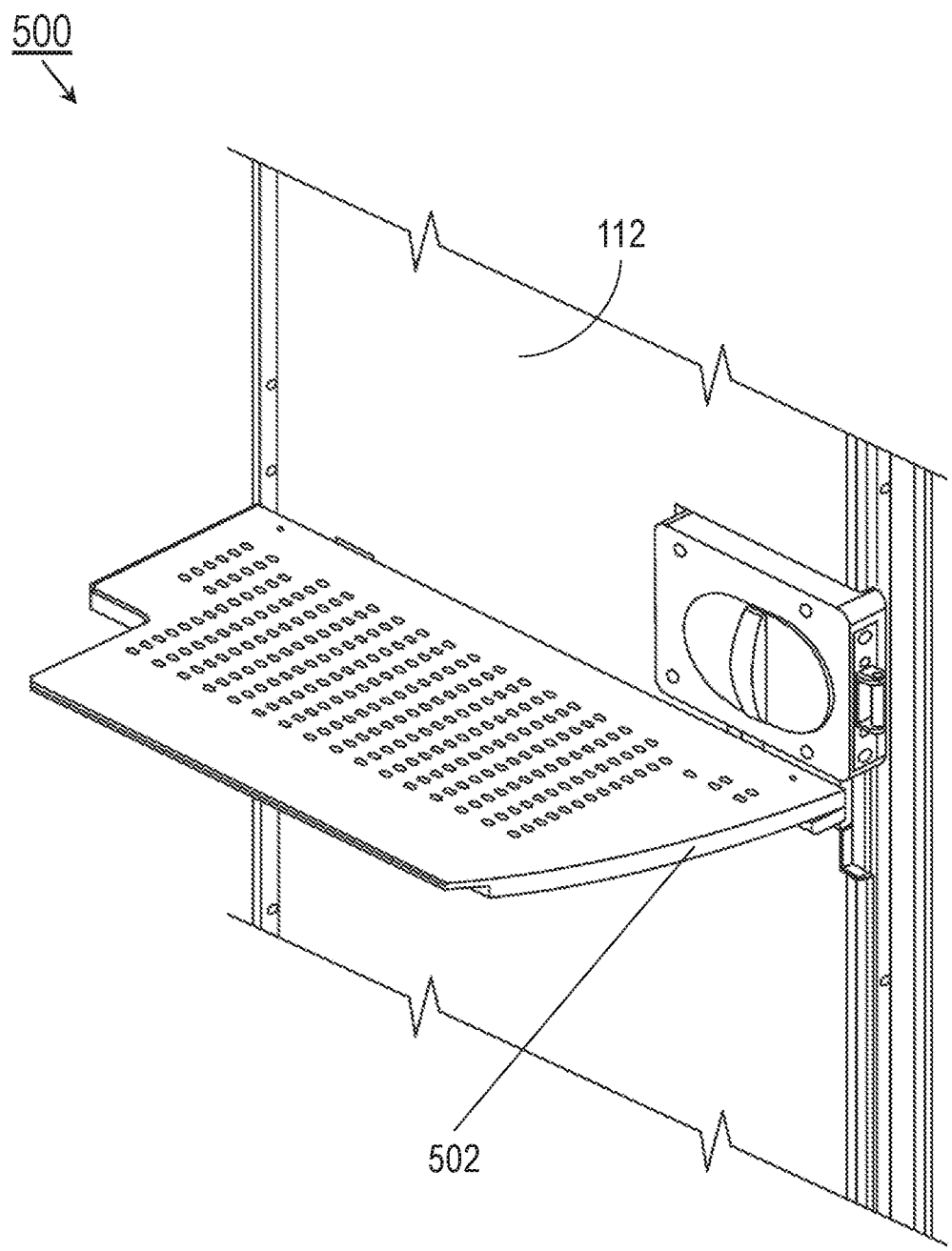
FIG. 5 is an overhead view of a closure panel of the overhead compartment of FIG. 1.

Referring to FIG. 5, the closure panel 500 may be implemented and may function similarly to the closure panels 120, 400 of FIGS. 1 through 4D, except that the closure panel 500 may be mounted to the door 112 in a fixed position.

In embodiments, when the door 112 is closed, the closure panel 500 may rotate with the door into a deployed position, substantially horizontal and aligned with the floor (110, FIG. 1) of the overhead compartment 100. For example, the closure panel 500 may safely block the free space (118, FIG. 1) without the need for moving parts or deployment systems. In some embodiments, the outer surfaces or edges of the closure panel 500 may be profiled (502) to ensure a smooth opening and closing of the door 112 or contour the closure panel to the precise dimensions of the overhead compartment 100, the stairway (108, FIG. 1), and/or the free space 118.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A stair closure mechanism, comprising:
   a substantially vertical door configured for at least partially separating a main cabin of an aircraft from an overhead compartment located above the main cabin and a stairway connecting the main cabin to the overhead compartment, the door having at least a closed state and an open state;
   a closure panel pivotably mounted to the door, the closure panel having an undeployed state substantially parallel to the door and a deployed state coplanar with a floor of the overhead compartment, the closure panel configured to mechanically pivot from the undeployed position to the deployed position in response to the transition of the door from the open state to the closed state;
   and
   at least one torsion spring coupled to the closure panel and to the door, the torsion spring configured for at least one of:
   a) securing the closure panel in the undeployed position when the door is in the open state;
   or
   b) pivoting the closure panel from the deployed position to the undeployed position when the door is transitioned from the closed state to the open state.

2. The stair closure mechanism of claim 1, wherein:
the closure panel includes an array of perforations in a spaced apart relationship, the array of perforations configured to permit airflow through the closure panel.

3. The stair closure mechanism of claim 1, wherein:
the closure panel includes at least one pin configured to secure the door in the closed state when the closure panel bears a load by engaging with a corresponding slot in the floor of the overhead compartment.

4. The stair closure mechanism of claim 1, wherein the closure panel includes at least one extension configured for transferring a load borne by the closure panel to at least one of the floor and a bulkhead, the bulkhead adjacent to at least one of the stairway and the overhead compartment.

5. The stair closure mechanism of claim 1, wherein:
the closure panel includes at least one lever arm fixed thereto, the lever arm configured to engage with at least one block fixed to at least one of the floor or the stairway.

6. The stair closure mechanism of claim 1, wherein:
the door includes at least one first magnetic surface fixed thereto and the closure panel includes at least one second magnetic surface fixed thereto, the first and second magnetic surfaces configured to secure the closure panel in the undeployed position via mutual attraction;
and
the closure panel includes at least one trigger configured for disengaging the mutual attraction of the first and second magnetic surfaces.

7. The stair closure mechanism of claim 1, wherein:
the closure panel includes at least one first magnetic surface configured to secure the closure panel in the deployed position by engaging with a second magnetic surface, the second magnetic surface mounted to at least one of the floor of the overhead compartment and a step of the stairway.

8. The stair closure mechanism of claim 1, wherein:
the closure panel includes at least one handle capable of accommodating a hand of a user, the handle configured to allow the user to manually pivot the closure panel from the deployed position to the undeployed position.

* * * * *